(12) United States Patent
Hui et al.

(10) Patent No.: US 8,928,486 B2
(45) Date of Patent: Jan. 6, 2015

(54) PRESSURE-BASED BLOCKAGE DETECTION SYSTEM AND METHOD IN CROP PRODUCTION SYSTEMS

(75) Inventors: Ka Po Catherine Hui, Saskatoon (CA); Joel John Octave Gervais, Saskatoon (CA); James Wayne Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 155 days.

(21) Appl. No.: 13/585,762

(22) Filed: Aug. 14, 2012

(65) Prior Publication Data
US 2014/0049395 A1  Feb. 20, 2014

(51) Int. Cl.
*G08B 21/00* (2006.01)

(52) U.S. Cl.
USPC ........................ 340/608; 56/10.2 R; 56/10.2 J

(58) Field of Classification Search
CPC ....................................... G08B 21/00
USPC ............ 340/608; 56/10.2 R, 10.2 J, 13, 13.1, 56/13.4
See application file for complete search history.

(56) References Cited

U.S. PATENT DOCUMENTS

| 3,863,428 | A | * | 2/1975 | Baxter | 56/10.2 R |
| 4,193,248 | A | * | 3/1980 | Gilleman | 460/3 |
| 5,784,871 | A | * | 7/1998 | Glancey et al. | 56/327.1 |

* cited by examiner

*Primary Examiner* — Jeffrey Hofsass
(74) *Attorney, Agent, or Firm* — Rebecca L. Henkel

(57) ABSTRACT

A crop production system, including at least one electrical sensor configured to measure pressure within a pneumatic flow path configured to convey a particulate material and transmit a first signal indicative of pressure, a controller coupled to the sensor and configured to detect a blockage in the crop production system based on a change in the first signal.

19 Claims, 4 Drawing Sheets

PRESSURE-BASED BLOCKAGE DETECTION SYSTEM AND METHOD IN CROP PRODUCTION SYSTEMS

BACKGROUND

The invention relates generally to a system and method for detecting blockage in crop production systems.

Generally, a tractor or work vehicle tows seeding or fertilizing implements via a hitch assembly that connects to a rigid frame of a planter, seeder or fertilizer applicator. These crop production systems typically include one or more delivery lines that carry particulate. In certain systems, ground engaging tools are used to break the soil to deposit particulate materials carried by these particulate delivery lines. After depositing the seeds or fertilizers, each ground engaging tool is followed by a packer wheel that packs the soil on top of the deposited seeds or fertilizers. For other crop production systems, granular materials may simply be spread onto the crops.

In certain configurations, an air cart is used to meter and deliver particulate material (e.g., seed, fertilizer, etc.) through the particulate delivery lines to the soil. As particulate moves through the particulate delivery lines, it can create a blockage in one or more of the particulate delivery lines. This causes uneven delivery of product and reduces crop yields. Certain crop production systems include optical or pin sensors that indicate a blockage in the system. These sensors are subject to excessive surface wear and may become partially or totally obscured by surface deposits, reducing reliability and sensor life. In addition, optical sensors may not be as robust and effective in a typical dusty farming environment.

BRIEF DESCRIPTION

In one embodiment, a crop production system, including at least one electrical sensor configured to measure pressure within a pneumatic flow path configured to convey a particulate material and transmit a first signal indicative of pressure, a controller coupled to the sensor and configured to detect a blockage in the crop production system based on a change in the first signal.

In another embodiment, a crop production system including a controller configured to receive a signal indicative of pressure within a pneumatic flow path configured to convey a particulate material, to monitor changing magnitudes or frequencies of the signal, and determine blockage in the crop production system based on a change in the magnitudes or frequencies of the signal outside a threshold range.

In a further embodiment, a method for determining blockage in a crop production system, including receiving a signal indicative of pressure magnitudes or frequencies within a pneumatic flow path, monitoring changes in the signal indicative of pressure magnitudes or frequencies, and determining blockage in the crop production system based on a change in the pressure magnitudes or frequencies outside a threshold range.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
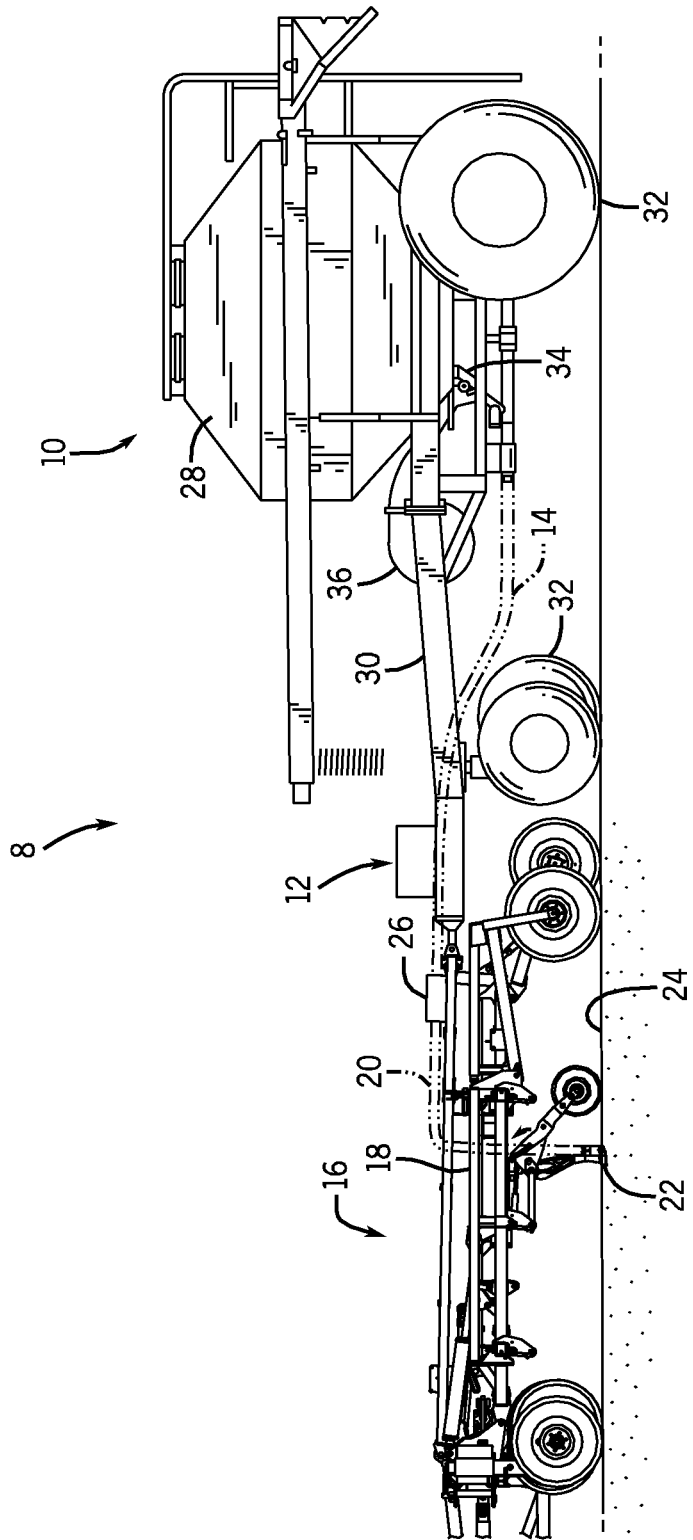
FIG. 1 is a side view of a crop production system that includes an embodiment of a blockage detection system.

FIG. 1 is an example of a crop production system (e.g. planter, air seeder, fertilizer applicator) which may employ an embodiment of a blockage detection system 12. This particular crop production system 8 (an air seeder) is connected to an air cart 10, equipped with a blockage detection system 12 capable of detecting blockage in a pneumatic flow path 14. In the illustrated embodiment, an implement 16 is coupled to an air cart 10, which is towed behind the implement 16 during operation and transport. The implement 16 includes a tool frame 18, particulate delivery line 20, and a ground engaging tool 22 coupled to the tool frame 18. The ground engaging tool 22 is configured to excavate a trench in the soil 24 to facilitate the depositing of seed and/or fertilizer that exits the particulate delivery line 20. In the illustrated embodiment, the ground engaging tool 22 receives product (e.g., seed, fertilizer) from a product distribution header 26 via a particulate delivery line 20 that extends between the header 26 and the ground engaging tool 22. Although FIG. 1 only illustrates one particulate delivery line 20, ground engaging tool 22, and product distribution header 26, it should be appreciated that alternative embodiments may include additional particulate delivery lines 20, tools 22, and headers 26 to facilitate product delivery across a wide swath of soil 24.

In the illustrated embodiment, the air cart 10 includes a storage tank 28, a frame 30, wheels 32, a metering system 34, and an air source 36. The frame 30 includes a towing hitch configured to couple to the implement 16 or tow vehicle, thereby enabling the air cart 10 to be towed across a field. In certain configurations, the storage tank 28 includes multiple compartments for storing various flowable particulate materials. For example, one compartment may include seeds, and another compartment may include a dry/granular fertilizer. In these configurations, the air cart 10 may be configured to deliver both seed and fertilizer to the implement 16 via separate distribution systems, or as a mixture through a single distribution system.

The seed and/or fertilizer within the storage tank 28 are fed into the metering system 34, thereby enabling the metering system 34 to distribute a desired quantity of product through the pneumatic flow path 14 and particulate delivery line 20 to the ground engaging tools 22. In the present embodiment, the metering system 34 includes sectioned meter rollers to regulate the flow of product from the storage tank 28 into an air flow provided by the air source 36. The air flow then carries the product through the pneumatic flow path 14 to the implement 16, thereby supplying header 26 and particulate delivery line 20 with seed and/or fertilizer for deposit in the soil 24. Although only one pneumatic flow path 14 is included in the illustrated embodiment, alternative embodiments may include additional pneumatic flow paths 14 to transfer product from the air cart 10 to various distribution headers 20 of the implement 16.

As discussed in detail below, as the particulate moves through the pneumatic flow path 14 and the particulate delivery line 20 it may build up at certain points creating a blockage. This prevents particulate delivery through the particulate delivery line 20 to the soil 24. A blockage therefore limits effective planting or fertilizing of a field, reducing crop yields. The blockage detection system 12 detects blockages for removal by an operator or a blockage removal system.

Figure 2:
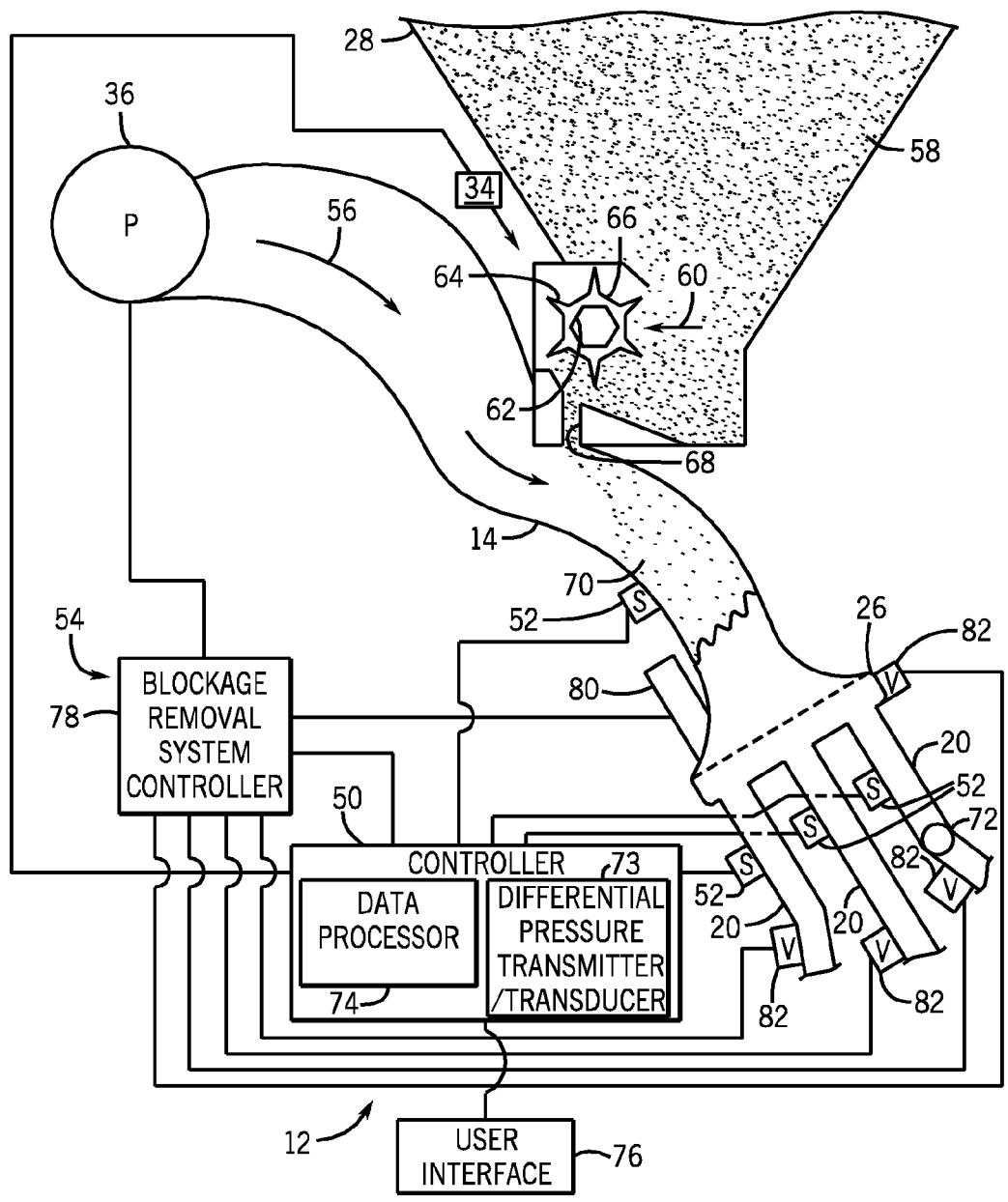
FIG. 2 is a schematic view of a blockage detection system capable of detecting blockage in the crop production system of FIG. 1.

FIG. 2 is a schematic view of a blockage detection system 12 capable of detecting blockage in the crop production system 8 (e.g., in the pneumatic flow path 14 and particulate delivery line 20). The blockage detection system 12 includes a controller 50 and sensors 52. The blockage detection system 12 may work in conjunction with a metering system 34 and a blockage removal system 54.

As illustrated, the air source 36 is coupled to a pneumatic flow path 14. The air source 36 moves air 56 past the metering system 34 to the header 26. The air source 36 may be a fan, pump, or blower powered by an electric or hydraulic motor. Particulate material 58 (e.g., seed, fertilizer) within the storage tank 28 flows into the metering system 34. The metering system 34 includes one or more meter rollers 60 configured to regulate the flow of product 58 into the air flow 56. The metering system 34 may include multiple meter rollers 60 disposed adjacent to one another along a longitudinal axis of the rollers 60 or one continuous meter roller 60.

Each meter roller 60 includes an interior cavity 62 configured to receive a shaft that drives the meter roller 60. The shaft is coupled to a drive unit, such as an electric or hydraulic motor, configured to rotate the meter rollers 60. Alternatively, the meter rollers 60 may be coupled to a wheel 32 by a gear assembly such that rotation of the wheel 32 drives the meter rollers 60 to rotate. Such a configuration will automatically vary the rotation rate of the meter rollers 60 based on the travel speed of the air cart 10.

Each meter roller 60 includes multiple flutes 64 and recesses 66. The illustrated embodiment includes six flutes 64 and a corresponding number of recesses 66. Alternative embodiments may include more or fewer flutes 64 and/or recesses 66. In addition, the depth of the recesses 66 and/or the height of the flutes 64 are configured to accommodate the product 58 within the storage tank 28. For example, a meter roller 60 may use deeper recesses 66 and fewer flutes 64 for larger seeds, while using a different meter roller 60 with shallower recesses 66 and more flutes 64 for smaller seeds. Other parameters may vary in alternative embodiments, such as flute pitch (i.e., rotation relative to a longitudinal axis) and flute angle (i.e., rotation relative to a radial axis).

The rotation rate of the meter roller 60 controls the flow of product 58 into the air stream 56. Specifically, as the meter roller 60 rotates, product transfers through an opening 68 in the metering system 34 into the pneumatic flow path 14. The product then mixes with the air flow 56 from the air source 36, thereby forming an air/product mixture 70. The mixture then flows to the header 26 for distribution to the particulate delivery line 20 and later deposit in the soil 24.

As the mixture 70 passes through the header 26 and into the particulate delivery lines 20 periodic blockages 72 may occur. The blockages 72 prevent even distribution of product 58 to the soil 24. Accordingly, accurately determining the occurrence of a blockage 72 ensures timely removal and continuous particulate delivery. The blockage detection system 12 detects blockages 72 in the crop production system 8 and works with the blockage removal system 54 to remove the blockage 72.

The blockage detection system 12 uses pressure sensors 52 to detect blockages 72 through pressure changes. The sensor 52 may be a pressure tap, Pitot tube or other pressure sensing devices. The sensors 52 sense fluctuating pressures through contact with the pneumatic flow path 14 and/or particulate delivery lines 20. The static tap allows sensors 52 to measure static pressure fluctuations, while the Pitot tube enables measurement of static and dynamic pressures.

As illustrated, a sensor 52 connects to the pneumatic flow path 14 and to each particulate delivery line 20. In some embodiments, the blockage detection system 12 uses a single sensor 52. This single sensor 52 may optimally connect with the pneumatic flow path 14 between the air source 36 and the header 26. This enables a single sensor 52 to detect a blockage 72 in the crop production system 8 without multiple sensors 52. In another embodiment, two sensors 52 (e.g., static tap, and Pitot tube) may connect to the pneumatic flow path 14. Thereby providing redundant pressure measurements by two different sensors 52. In other embodiments, each particulate delivery line 20 may include one or more sensors 52.

The controller 50 may include a differential pressure transmitter or pressure transducer 73 and a data processor 74. In other embodiments, the differential pressure transmitter or transducer 73 may be in close proximity to the sensor(s) 52. The differential pressure transmitter or transducer 73 receives the first signal from the sensor 52, digitizes and transmits the pressure readings to the data processor 74. The data processor 74 then converts the first signal into a proper measurement unit, either static and/or dynamic pressure, and analyzes it over time. If the magnitude of changes in pressure (i.e., the peak to peak amplitude) or the frequency of the oscillations is outside a threshold range, the controller 50 may send a second signal to a blockage removal system 54. Peak-to-peak amplitude is the change between peak (highest amplitude value) and trough (lowest amplitude value, which can be negative). The second signal indicating a blockage 72 that causes the blockage removal system 54 to begin removing the blockage 72. The controller 50 may also send a third and fourth signal to a respective user interface 76 and the metering system 34. The third signal may inform a user of a possible blockage, while the fourth signal causes the metering system 34 to slow or stop feeding particulate 58 into the pneumatic flow path 14. In some embodiments, the third signal may be an alarm and/or data showing pressure magnitude changes and the frequency of the oscillations of the first signal indicative of pressure. For example, the user interface 76 may display graphs with pressure data over time.

The blockage removal system 54 may include a blockage removal system controller 78, the air source 36, a compressed air injector 80, and vibrators 82. The blockage removal system 54 may use the air injector 80, the air source 36, and vibrators 82 alone or in combination to remove the blockage 72.

In order to remove the blockage 72 the air source may rapidly increase power that accelerates the air flow 56 through the pneumatic flow path 14 into the header 26 and through the particulate delivery lines 20, breaking up the blockage 72. Alternatively the air source may rapidly increase and decrease air flow 56 creating pulses of air that break up the blockage 72. In still other embodiments, the air source 36 provides a tailored response depending on the particulate.

The compressed air injector 80 is similarly able to remove blockages in particulate delivery lines 20. As illustrated, the air injector 80 connects to the pneumatic flow path 14 to deliver a rapid burst of air into the header 26 that distributes the air into the particulate delivery lines 20. This compressed air injector 80 may provide more powerful air flow than the air source 36. The compressed air injector 80 may also provide multiple bursts of air to break up blockages 72. Alternative embodiments may include more compressed air injectors 80. For example, each particulate delivery line 20 may have a compressed air injector for removal of blockage 72.

The vibrators 82 are another option for removing blockages 72 in the lines 20. The vibrators 82 remove the blockage 72 by shaking the particulate delivery lines 20 or header 26. In some embodiments, a larger vibrator 82 on the header 26 is sufficient to break up a blockage 72 in any one of the particulate delivery lines 20. In still other embodiments, individual vibrators 82 attach to each particulate delivery line 20 to remove blockages in a specific line 20. In still other embodiments, the vibrators 82 may attach at known trouble spots along the particulate delivery lines 20. This may reduce the size of vibrator 82 and focus vibration in a specific area.

Figure 3:
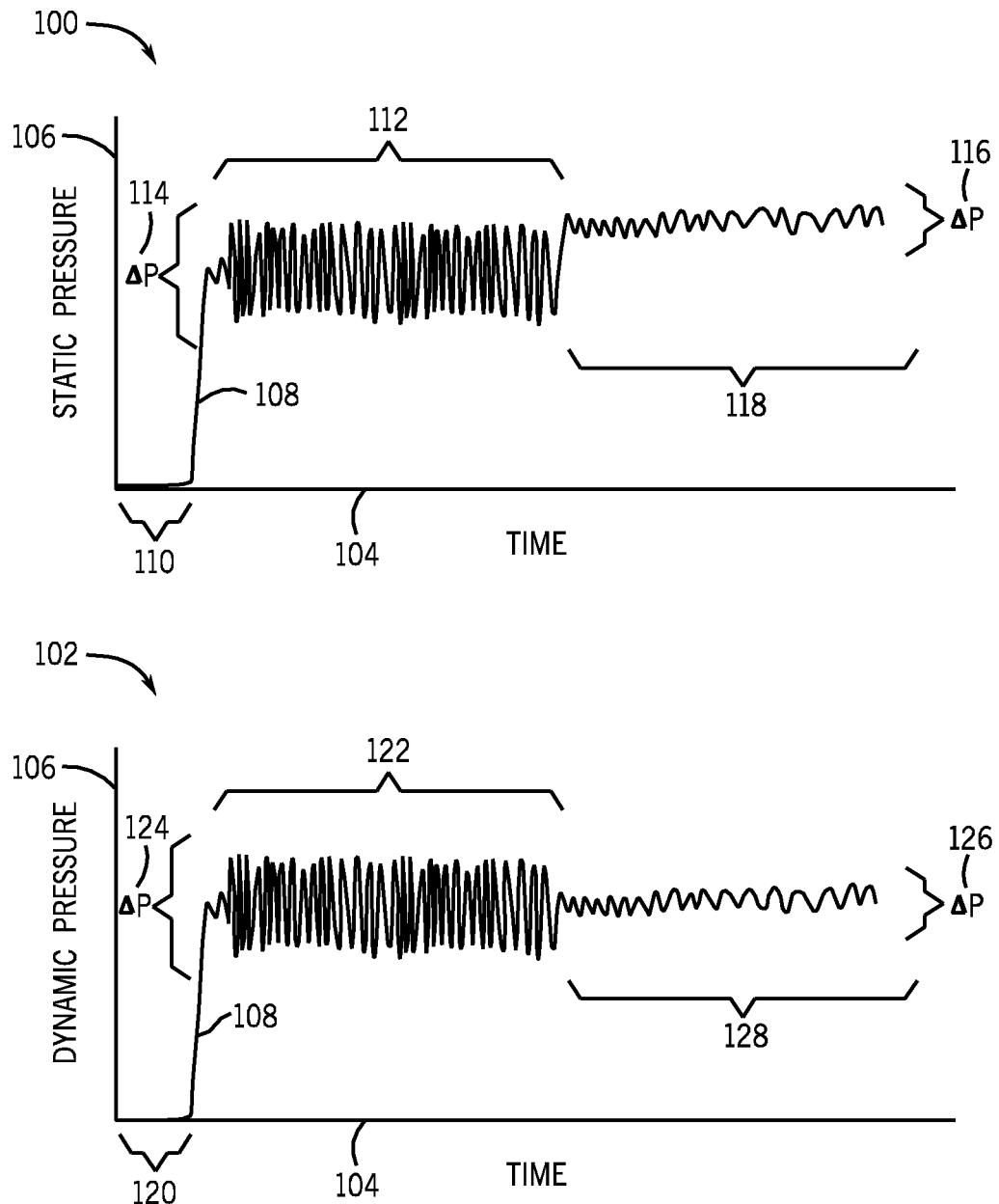
FIG. 3 illustrates two graphs that illustrate respective static and dynamic pressures measured with respect to time by the blockage detection system of FIG. 2.

FIG. 3 illustrates two graphs 100 and 102 that illustrate changes in respective static and dynamic pressures. As discussed previously, the sensors 52 sense changes in pressure used by the controller 50 for processing and analysis. Graphs 100 and 102 illustrate exemplary data received and processed by the controller 50. Graphs 100 and 102 define an x-axis 104 representing time and a y-axis 106 that represents pressure. The line 108 represents the first signal indicative of pressure with respect to time.

When the crop production system 8 starts, static pressure rapidly builds over a time period 110 until it reaches steady state operations, illustrated by time period 112. As explained above, in steady state operations the metering system 34 moves particulate 58 into the pneumatic flow path 14. It is there that the particulate 58 mixes with air flow 56 turning into mixture 70. The mixture 70 flowing through the pneumatic flow path 14 and particulate delivery lines 20 creates changes in the static pressure measured by the sensors 52. In steady state operations the magnitudes of the pressure changes remain within a threshold range 114. In addition, these changes in the pressure magnitudes may repeat a specific number of times in a given time interval (i.e., frequency). This threshold range 114 may be specific to a mixture 70. Accordingly, different mixtures 70 may create different pressure magnitudes and the frequency at which they occur, altering the threshold range 114. Absent a blockage 72, the changing static pressure remains within threshold range 114 until shutdown.

When a blockage 72 occurs the static pressure will change in the pneumatic flow path 14 and/or particulate delivery lines 20. In this particular example, the change in pressure magnitudes 116 will decrease below the threshold range 114 over a time period 118 while blockage occurs. The frequency may also change (i.e., frequency will slow down). When the controller 50 recognizes the change, it may warn the user with an alarm through the user interface 76, alter metering system 34, and/or activate blockage removal system 54. In some embodiments, the user interface 76 displays the graphs 100 and/or 102 in addition to the alarm. This enables the user to monitor the data in addition to receiving the warning.

Similar to graph 100 the graph 102 exhibits changes in the pressure magnitudes, but for dynamic pressure. When the crop production system 8 starts, dynamic pressure rapidly builds over a time period 120 until it reaches steady state operations, illustrated by time period 122. In steady state operations the dynamic pressure magnitudes remain within a threshold range 124 and may occur at a certain frequency. This threshold range 124 may also be specific to a mixture 70. Accordingly, different mixtures 70 may create different changes in the pressure magnitudes, altering the threshold range 124. Absent a blockage 72, the changing dynamic pressure magnitudes remain within the threshold range 124 and at a certain frequency until shutdown.

When a blockage 72 occurs the dynamic pressure will change in the pneumatic flow path 14 and/or particulate delivery lines 20. In this particular example, the change in the dynamic pressure magnitudes 126 will decrease below the threshold range 124 over a time period 128 while blockage occurs. When the controller 50 recognizes the change, it may warn the user with an alarm through the user interface 76, alter metering system 34, and/or activate blockage removal system 54.

Figure 4:
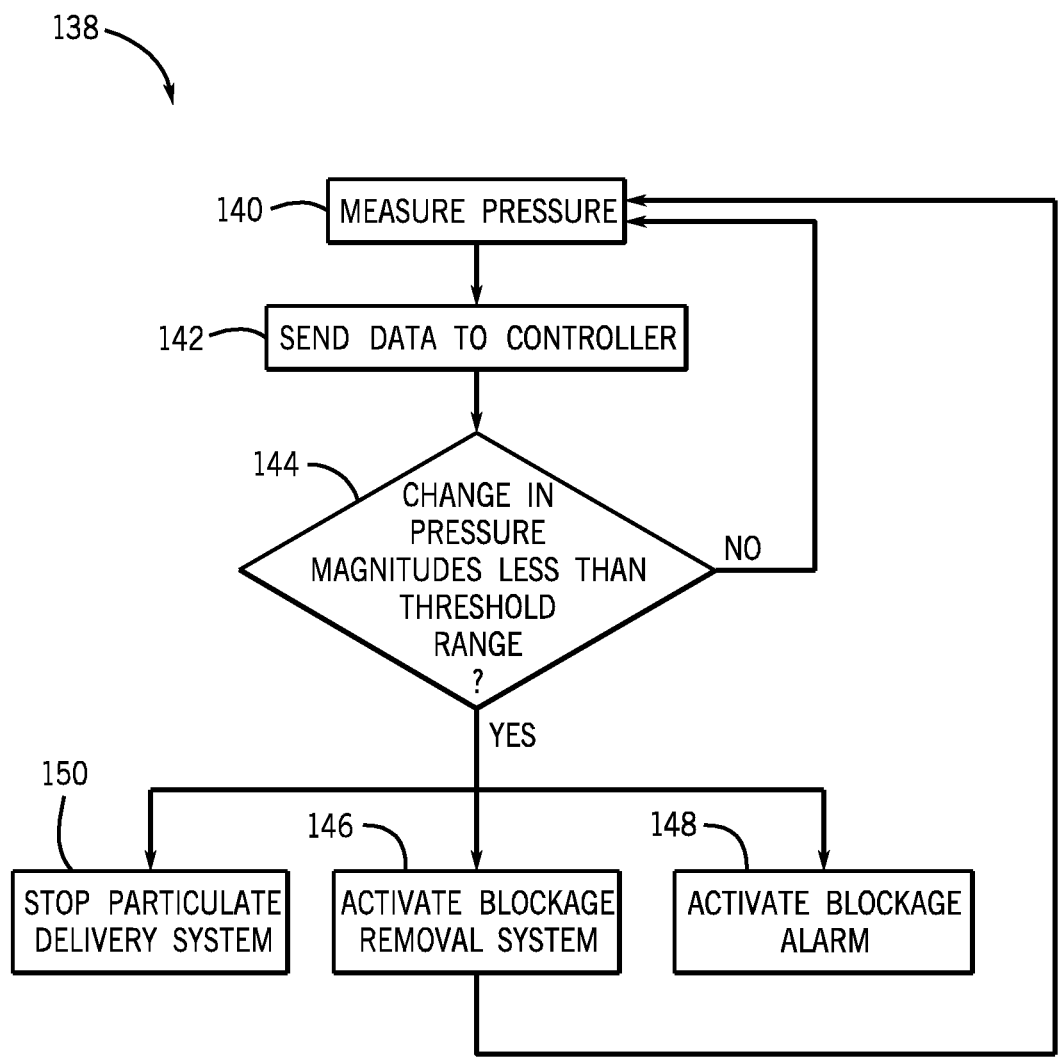
FIG. 4 is a flowchart of an exemplary method for determining blockage in a pneumatic flow path using the blockage detection system of FIG. 1.

FIG. 4 is a flowchart of an exemplary method 138 for determining blockage in a pneumatic flow path 14 and/or particulate delivery lines 20 using the blockage detection system 12 of FIG. 1. First, as represented by block 140, static and/or dynamic pressure is measured by sensors 52. This data is sent to the controller 50 in a first signal, represented by block 142. In block 144, the controller 50 receives the data and calculates the change in the pressure magnitudes with the first signal and determines if the change is less than a threshold range over a period of time. If the change is not less than a threshold range the method returns to block 140. If there is a decrease below a threshold range the controller 50 sends second, third, and fourth signals. In some embodiments, the controller 50 may also monitor the frequency at which the changes in the pressure magnitudes occur, to aid in the detection of blockages.

The second signal activates the blockage removal system 54, represented by block 146. As discussed above, the blockage removal system 54 may break up a blockage using the air source 36, the compressed air injector 80, and/or the vibrators 82 or other means to remove the blockage. The third signal activates a blockage alarm of the user interface 76, represented by block 148. This gives the user awareness and the ability to monitor a potential problem in the delivery of particulate 58. The fourth signal stops or alters the particulate delivery system 150, represented by block 150. This prevents additional particulate 58 from adding to the current blockage 72, during removal attempts by the blockage removal system 54. As the blockage removal system 54 works on removing the blockage 72 the method recycles to block 140 and continues to monitor the pressure with sensors 52 for an indication of blockage 72 removal. After removing blockage 72 the alarm stops, the blockage removal system 54 stops, the particulate delivery system 34 resumes normal operations, and the method 138 continues to cycle through steps in blocks 140, 142, and 144.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A crop production system, comprising:
  an air source configured to provide an air flow to convey a particulate material through a pneumatic flow path;
  at least one electrical sensor configured to determine pressure within the pneumatic flow path and to transmit a first signal indicative of the pressure; and
  a controller communicatively coupled to the sensor and to the air source, wherein the controller is configured to detect a blockage in the crop production system based on a change in the first signal and to transmit a second signal to the air source that instructs the air source to change operation in response to detection of the blockage.

2. The system of claim 1, wherein the electrical sensor may be positioned anywhere along the pneumatic flow path.

3. The system of claim 1, wherein the second signal is indicative of a change in a speed of the air flow.

4. The system of claim 1, wherein a user interface is configured to display an alarm indicating blockage in the crop production system in response to a third signal from the controller.

5. The system of claim 4, wherein the user interface is configured to display changes in the first signal indicative of the pressure.

6. The system of claim 1, comprising a particulate delivery system configured to alter particulate delivery upon receiving a third signal from the controller indicating blockage.

7. The system of claim 1, wherein the electrical sensor is configured to determine static pressure or dynamic pressure.

8. The system of claim 1, wherein the second signal is indicative of an increase in a speed of the air flow.

9. The system of claim 1, wherein the second signal is indicative of alternating decreasing and increasing speeds of the air flow.

10. The system of claim 1, wherein the controller signals a compressed air injector to release compressed air into the pneumatic flow path in response to detection of the blockage in the crop production system.

11. The system of claim 1, wherein the controller signals a vibrator to vibrate a particulate distribution line in response to detection of the blockage in the crop production system.

12. A crop production system comprising:
   a controller configured to receive a signal indicative of pressure within a pneumatic flow path configured to convey a particulate material, to monitor a magnitude of oscillations of the signal, and determine blockage in the pneumatic seed distribution system based on a change in the oscillations of the signal below a threshold range or a change in the frequency of the oscillations of the signal.

13. The crop production system of claim 12, wherein the controller is configured to activate a blockage alarm in response to detecting the blockage.

14. The crop production system of claim 12, wherein the controller is configured to activate a blockage removal system to remove the blockage in response to detecting the blockage.

15. The crop production system of claim 12, wherein the controller is configured to stop a particulate delivery system in response to detecting the blockage.

16. The crop production system of claim 12, wherein the controller is configured to send the changes in pressure magnitudes or frequencies to a user interface.

17. A method for determining blockage in a crop production system, comprising:
   receiving a signal indicative of pressure within a pneumatic flow path;
   calculating a magnitude of oscillations within the signal; and
   determining blockage in the pneumatic seed distribution system based on a decrease in the magnitude of the oscillations of the signal below a threshold range a change in the frequency of the oscillations of the signal.

18. The method of claim 17, comprising stopping a particulate delivery system in response to detecting the blockage.

19. The method of claim 18, comprising removing the blockage by activating a blockage removal system.

* * * * *